June 20, 1933.  L. V. LEWIS ET AL  1,914,608
TRAIN CONTROL DEVICE
Filed May 14, 1929  2 Sheets-Sheet 2
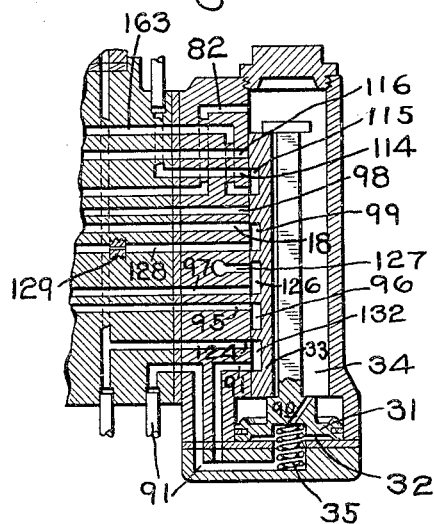
INVENTORS
LLOYD V. LEWIS
AND
EARLE S. COOK
BY Wm. M. Cady Patented June 20, 1933

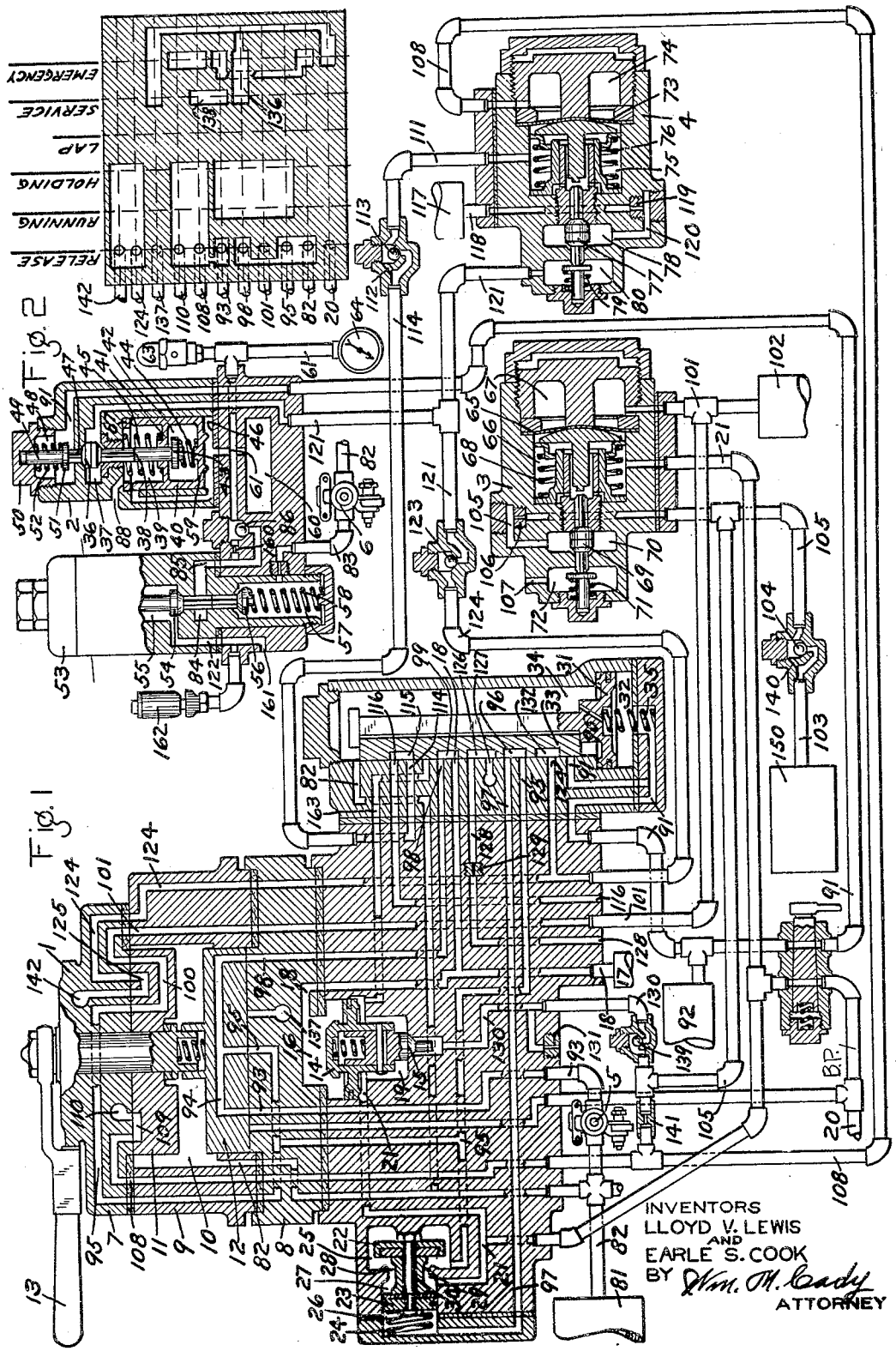

1,914,608

UNITED STATES PATENT OFFICE

LLOYD V. LEWIS, OF EDGEWOOD, AND EARLE S. COOK, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA

TRAIN CONTROL DEVICE

Application filed May 14, 1929. Serial No. 363,010.

This invention relates to automatic train control apparatus adapted to control railway trains in accordance with the traffic conditions.

Means have heretofore been disclosed in Patent No. 1,553,603 of Clyde C. Farmer and Thomas H. Thomas, issued September 15, 1925, whereby, when desired an operator may prevent an automatic application of the brakes from being effected, by operation of the train control apparatus, by manually effecting an application of the brakes in the usual manner.

The principal object of our invention is to provide improved means by which the operator may suppress an automatic train control application of the brakes.

Other objects and advantages will appear in the following more detailed description of our invention.

In the accompanying drawings; Figure 1 is a diagrammatic view, partly in section, of an automatic train speed control apparatus embodying our invention; Fig. 2 is a development view of the brake valve device shown in Fig. 1 of the drawings; and Fig. 3 is a diagrammatic view of the brake application valve mechanism shown in application position.

As shown in the drawings, the equipment comprises a brake valve device 1, a timing valve device 2, a brake pipe reduction insuring valve device 3, a brake application suppression valve device 4, and two feed valve devices 5 and 6.

The brake valve device 1 comprises an upper casing section 7, a lower casing section 8 and an intermediate casing section 9, and contained in a chamber 10 formed within the intermediate casing section by the upper and lower casing sections 7 and 8 respectively, are two rotary valves 11 and 12, both rotary valves being operable by a handle 13.

Contained in the lower casing section 8 of the brake valve device is the usual equalizing discharge valve mechanism comprising a piston 14 and a brake pipe discharge valve 15 adapted to be operated by said piston. The equalizing piston has a chamber 16 at its upper face, which chamber is connected with an equalizing reservoir 17 through a passage and pipe 18 and a chamber 19 at its lower face, which chamber is in constant communication with a brake pipe 20, through a passage and pipe 21.

Associated with the brake valve device is a cut-off valve mechanism comprising a valve 22 and a piston 23 adapted to operate said valve; seating of said valve being opposed by the pressure of a spring 24 on said piston. The valve 22 is contained in a chamber 25. The piston has at one side a chamber 26 and at the opposite side a chamber 27, the chambers 25 and 27 being separated by a wall 28 having an opening 29 through which a stem 30, connecting the valve 22 with the piston 23, is adapted to operate.

Also associated with the brake valve device is a brake application valve mechanism comprising a piston 31 contained in a chamber 32 and a slide valve 33 contained in a valve chamber 34 and adapted to be operated by said piston, outward movement of said piston being opposed by the pressure of a spring 35.

For controlling the operation of the application piston 31, the timing valve device 2 is provided and comprises a valve portion, and a magnet portion for governing the operation of the valve portion.

The valve portion of the timing valve device 2 comprises a double beat valve 36 contained in a chamber 37 and having a fluted stem 38 extending through a chamber 39, at the upper side of a valve piston 40, and through an opening in a wall 41 of said valve piston and into a chamber 42, wherein said stem is provided with a collar 43 against which a spring 44 acts, said spring being adapted to operate the double beat valve 36 upon upward movement of said valve piston. Interposed between wall 41 in the valve piston and the casing, is a spring 45 adapted to urge said valve piston downwardly and cause a seat ring 59 to engage a gasket 46. The double beat valve 36 is also provided with a fluted stem 47 extending upwardly into a chamber 48. Contained in chamber 48 is a member 49, the upper end of which is slidably mounted in a nut 50 having screw-threaded engagement in the casing. A collar 51 is formed at the lower end of said member and interposed between said collar and nut is a spring 52, which is adapted to maintain the collar 51 in engagement with the valve stem 47 and urge the valve 36 downwardly.

The magnet portion of the timing valve device comprises a magnet 53, a valve 54 contained in a chamber 55, and a valve 56 contained in a chamber 57. The magnet, upon energization, is adapted to seat valve 54 and unseat valve 56 and when said magnet is deenergized, a spring 58, contained in the chamber 57, is adapted to seat valve 56 and unseat valve 54.

The magnet 53 is adapted to operate in accordance with the traffic conditions on a railway and may be governed by induced current from a circuit or circuits provided in the track rails (not shown), in such a manner that when the traffic conditions are favorable, said magnet will be energized and when unfavorable or if a train should be stopped, said magnet will be deenergized.

The magnet valves 54 and 56 are adapted to control the supply and venting of fluid under pressure to and from a timing reservoir 60, which is connected through a passage 61 to the lower face of the valve piston 40. Connected to the timing reservoir through the pipe and passage 61 is a safety valve device 63 for limiting the pressure in said reservoir, and a pressure gauge 64 for visibly indicating to the operator, the pressure contained in said reservoir.

The brake pipe reduction ensuring valve device 3 comprises a flexible diaphragm 65, subject to the opposing fluid pressures in diaphragm chambers 66 and 67 and to the pressure of a coil spring 68 contained in the chamber 66, said diaphragm being adapted to operate a double beat valve 69 contained in a chamber 70 against the pressure of a spring 71 contained in a chamber 72.

The brake application suppression valve device 4 comprises a flexible diaphragm 73, subject to the opposing fluid pressures in diaphragm chambers 74 and 75 and the pressure of a coil spring 76 contained in the chamber 75 and is adapted to operate a double beat valve 77, contained in a chamber 78, against the pressure of a coil spring 79 contained in a chamber 80.

The two feed valve devices 5 and 6 are of the usual well known construction, the feed valve device 5 being adapted to supply fluid under pressure to the brake pipe, such as 70 pounds for freight service or 110 pounds for passenger service, whereas the feed valve device 6 is adapted to supply fluid at a constant pressure for the operation of the automatic train control apparatus, irrespective of the pressure carried in the brake pipe.

In operation, the main reservoir 81 being charged with fluid under pressure in the usual manner, fluid flows therefrom through a pipe and passage 82 to the rotary valve chamber 10 of the brake valve device 1, to the application valve chamber 34 and to the feed valve devices 5 and 6.

Assuming that the train is running on trackway where the traffic conditions are favorable, the magnet 53 is energized and operates to seat valve 54 and unseat valve 56. Fluid at the reduced pressure employed in the train control apparatus is supplied by the feed valve device 6 through pipe and passage 83 to chamber 57, then flows past the valve 56 to a chamber 84 and from thence through passage 85, past a ball check valve 86 and through passage 61 to the timing reservoir 60 and pressure gauge 64.

Fluid at the pressure in the timing reservoir 60 acts on the lower face of the valve piston 40 inside of the seat ring 59 and when said pressure becomes slightly greater than the downwardly acting pressure of spring 45, said piston is moved upwardly into engagement with a seal 87.

The upward movement of valve piston 40, shifts the double beat valve 36 to its upper or normal position, in which position chamber 37 is connected with the atmosphere past the fluted valve stem 38, through chamber 39 and through an atmospheric passage 88.

Fluid at main reservoir pressure supplied to the application valve chamber 34 flows through a port 90 in the application piston 31 to the piston chamber 32 and from thence through passage and pipe 91 to a reservoir 92 and chamber 48 in the timing valve portion 2. Since the double beat valve 36 is seated in its upper position however, the fluid pressure builds up in the application piston chamber 32. When the pressure in said piston chamber becomes substantially equal to the pressure in the valve chamber 34, the spring 35 urges the application piston 31 and slide valve 33 to the upper, normal or release position, as shown in the drawings.

Fluid at the reduced pressure normally carried in the brake pipe 20 is supplied by the feed valve device 5 through pipe and passage 93 to the seat of the rotary valve 12 in the brake valve device. With the brake valve device in running position, as shown in the drawings, fluid at feed valve pressure flows from passage 93 through cavity 94 in the rotary valve 12 to passage 95 and from thence to the cut-off valve chamber 25 and also from passage 95 through cavity 96 in the application slide valve 33, when said slide valve is in release position, to passage 97 and from thence to the cut-off valve piston chamber 26. As the pressures build up on the opposite sides of the cut-off valve piston 23 at the same time, the cut-off valve 22 remains unseated due to the pressure of spring 24, and thereby permits fluid at feed valve pressure to flow from valve chamber 25 through chamber 27 and passage and pipe 21 to the equalizing piston chamber 19 and to the brake pipe 20.

Fluid at the pressure supplied by the feed valve device 5 also flows from cavity 94 in the rotary valve 12 through passage 98, cavity 99 in the application slide valve and passage 18 to the equalizing piston chamber 16 and equalizing reservoir 17. The fluid pressures thus become substantially equal in chambers 16 and 19 at the opposite sides of the equalizing piston 14, so that said piston operates to seat the discharge valve 15 in the usual well known manner.

With the brake valve device in running position, diaphragm chamber 67 of the brake pipe reduction ensuring valve device and the connected suppression reservoir 102 are charged with fluid at the pressure supplied by the feed valve device 5 from passage 95, through cavity 100 in the rotary valve 11, and passage 101. Chamber 66 at the opposite side of the diaphragm 65, being connected to the brake pipe 20 through passage and pipe 21, is also charged with fluid at the same pressure, so that spring 68 is thereby permitted to deflect the diaphragm to the right and permit spring 71 to seat the double beat valve 69 in the position shown in the drawings, in which position a timing reservoir 150 is connected with the atmosphere through pipe 103, past a ball check valve 104, through pipe and passage 105, a choke plug 106, chamber 70, past the fluted stem of the double beat valve 69, chamber 72 and an atmospheric passage 107.

When the brake valve device is in running position, the diaphragm chamber 74 in the suppression valve device 4 is normally at atmospheric pressure due to the connection through passage and pipe 108, cavity 109 in the rotary valve 11 of the brake valve device and to an atmospheric passage 110. When the application slide valve 33 is in release position, chamber 75 at the opposite side of diaphragm 73 is also normally connected to the atmosphere by way of passage and pipe 111, a choked opening 112 around a ball check valve 113, passage and pipe 114, cavity 115 in said application slide valve and an atmospheric passage 116. As a result, the spring 76 is permitted to deflect the diaphragm 73 to the right. Spring 79 then urges the double beat valve 77 to the right hand seat, in which position a stop reservoir 117 is connected to the atmosphere through pipe and passage 118, a choke plug 119, passage 120, chamber 78, past the fluted stem of valve 77 to chamber 80, and from thence through passage and pipe 121, valve chamber 37 in the timing valve device 2, past the fluted valve stem 38 to chamber 39 and through an atmospheric passage 88.

If the traffic condition changes from favorable to unfavorable, the magnet 53 is thereby deenergized and operates to permit spring 58 to seat valve 56 and unseat valve 54 which permits fluid under pressure to be vented from the timing reservoir 60 to the atmosphere by way of passage 61 through a choked opening 160, passage 85, chamber 84, past valve 54 and from thence to the atmosphere through a passage 122 having a restricted vent 161, and at the same time through a whistle device 162, the choked opening 160 being adapted to govern the rate of reduction in pressure in the timing reservoir 60, whereas the restricted vent 161 is of less capacity than the opening 160 and thereby causes a portion of the fluid under pressure vented from the timing reservoir to flow through the whistle device 162 to operate same.

When the pressure in the timing reservoir 60, acting on the valve piston 40, is thus reduced to a predetermined degree, the spring 45 shifts the valve piston 40 downwardly causing the seat ring 59 to engage the gasket 46 and permitting spring 52 to shift the double beat valve 36 downwardly to its lower seat.

With the double beat valve 36 thus seated in its lower or application position, fluid under pressure is vented from the application piston chamber 32 to the atmosphere through passage and pipe 91, past valve 36, through chamber 37, passage and pipe 121, past a ball check valve 123, thence through pipe and passage 124, cavity 125 in rotary valve 11 of the brake valve device and the atmospheric passage 142.

When the pressure is thus reduced in the application piston chamber 32, the pressure in the valve chamber 34 shifts the application piston 31 and slide valve 33 downwardly to application position against the pressure of the spring 35. In application position of the application slide valve, cavity 126 in said slide valve connects passage 97 from the cut-off valve piston chamber 26 to an atmospheric passage 127, thereby venting the fluid under pressure from said chamber to the atmosphere. Fluid at brake pipe pressure in chamber 27 at the opposite side of the cut-off valve piston then shifts said piston outwardly, compressing spring 24, and seating the cut-off valve 22 on the seat rib 28, so as to prevent further flow of fluid at feed valve pressure from chamber 25 to the brake pipe 20 by way of passage 21.

At the same time as the cut-off valve 22 is thus closed, the equalizing piston chamber 16 and equalizing reservoir 17 are connected to the atmosphere through passage 18, cavity 99 in the application slide valve and an atmospheric passage 128 containing a choke plug 129, so that fluid under pressure is vented from said chamber and reservoir, which causes a reduction in pressure in said chamber. The brake pipe pressure in chamber 19 at the opposite side of said piston then operates said piston to unseat the brake pipe discharge valve 15 to permit fluid under pressure to flow from the brake pipe 20 to the atmosphere by way of passage 21, chamber 19, passage 130 and to the atmosphere through an atmospheric choke plug 131, thereby reducing the brake pipe pressure in order to apply the brakes in the usual well known manner.

When the application slide valve 33 is in application position, a cavity 132 in said slide valve connects passage 91 from the application piston chamber 32 to passage 124 which is connected to atmosphere through cavity 125 in rotary valve 11 and passage 142, so that when an application of the brakes is effected as above described, the application piston chamber is maintained vented and the application slide valve therefore remains in its application position, in which the equalizing reservoir pressure is reduced to atmospheric pressure. This results in the brake pipe pressure being reduced to atmospheric pressure, which is unnecessary to effect a full service application of the brakes.

In order to prevent the brake pipe pressure from being reduced to atmospheric pressure as just described, the operator may move the brake valve to lap position as soon as the whistle 162 blows, the blowing of said whistle indicating the change in track condition from favorable to unfavorable.

By moving the brake valve to lap position, passage 124 is lapped, so that the fluid under pressure vented from the application piston chamber 32 by way of double beat valve 36 in the timing valve portion and passage and pipe 121, past check valve 123 and to passage 124 is not vented to the atmosphere but can only flow from passage 121 past the double beat valve 77 in the brake application suppression valve device 4 and to the stop reservoir 117. When the pressure in the stop reservoir and application piston chamber 32 then becomes substantially equal to the pressure in the application valve chamber 34 by flow through port 90 in the application piston 31, the pressure of spring 35 shifts the application piston 31 and slide valve 33 upwardly to their normal position, in which position passage 18 from the equalizing piston chamber 16 and equalizing reservoir 17 is disconnected from exhaust passage 128, and cavity 99 in said slide valve connects passage 18 to passage 98 from the seat of the rotary valve 12. Passage 98 being lapped by said rotary valve, when the brake valve device is in lap position, further reduction in the pressure in the equalizing reservoir and equalizing piston chamber 16 is prevented. When the brake pipe pressure is then reduced a degree slightly exceeding the degree of reduction in equalizing reservoir pressure, the equalizing piston 14 operates to seat the discharge valve 15 and prevent further reduction in brake pipe pressure, in the usual well known manner.

When a train control application of the brakes is effected in the manner just described, and the brake valve device is turned to lap position, fluid at brake pipe pressure is supplied to diaphragm chamber 75 in the suppression valve device 4 by way of brake pipe passage 21, equalizing piston chamber 19, passage 163, cavity 115 in the application slide valve 33, passage and pipe 114, past the ball check valve 113 and through passage and pipe 111, and fluid at the pressure discharged from the brake pipe 20 past the discharge valve 15 is supplied to diaphragm chamber 74 of the suppression valve device through passage and pipe 130, past check valve 139, through pipe 105, choked opening 141 and pipe and passage 108. Thus, while the brake pipe pressure is being reduced, the fluid pressures on the opposite sides of the suppression valve diaphragm 73 are maintained substantially equal and spring 76 maintains said diaphragm deflected to the right, in which position spring 79 holds the double beat valve 77 seated in its inner position. However, after the stop reservoir is charged and the application slide valve 33 is shifted back to its normal position, as hereinbefore described, then the fluid under pressure is vented from the diaphragm chamber 75 through pipe 111, choked port 112 around the check valve 113, pipe and passage 114, cavity 115 in the application slide valve 33 and atmospheric passage 116. The reduction in pressure in said chamber 75 permits the higher pressure in diaphragm chamber 74 to deflect the diaphragm 73 to the left and shift the double beat valve 77 toward its outer seat, thereby connecting chamber 78 to chamber 75 and permitting fluid under pressure to flow from the stop reservoir 117 past double beat valve 77 to chamber 75 and from thence through pipe 111 and port 112 around check valve 113 to the atmosphere as just described above. The flow area of the choked port 112 is so restricted however, that the rate of reduction in pressure in diaphragm chamber 75 is very slow. Consequently, the valve 77 is only slightly unseated toward the left and permits a flow of fluid under pressure from the stop reservoir to chamber 75 at a rate not exceeding the rate of supply to said reservoir through port 90 in the application piston 31, passage and pipe 91, past the timing double beat valve 36, through passage and pipe 121 to chamber 80 in the suppression valve device and from thence past the partially open double beat valve 77 to chamber 78 and the connected stop reservoir. If the rate of flow through the port 112 exceeded the rate of flow through port 90 in the application piston, then the pressure would become reduced in the application piston chamber 32 and cause said piston to shift the slide valve 33 downwardly and connect brake pipe passage 21 to the suppression diaphragm chamber 75, which would operate diaphragm 73 to seat double beat valve 77 in its inner position, in which the application piston would again move back to its normal position and then the operation would be repeated. The size of choked port 112 is therefore such as to prevent repeated operation or pumping of the application piston 31, which would effect unnecessary reductions in equalizing reservoir pressure.

In effecting a brake application, as hereinbefore described and with the brake valve in lap position, it will be noted that the stop reservoir is of such volume as to maintain the application piston 31 and slide valve 33 in their downward or application position for a period of time sufficient to effect a full service application of the brakes.

If, after a train control application of the brakes is effected, the track condition becomes favorable, then the magnet 53 becomes energized again and operates to seat valve 54 and unseat valve 56. With valve 56 unseated, fluid under pressure again flows from the feed valve device 6 to the timing reservoir 60, thereby charging said reservoir. When the pressure in said reservoir becomes sufficient to overcome the pressure of spring 45, the valve piston 40 is again operated to seat the double beat valve 36 in its upper position and thereby close communication from the application piston chamber 32 to the stop reservoir 117, the fluid under pressure from said reservoir being vented to the atmosphere by way of passage and pipe 121, past the lower seat of double beat valve 36, through chamber 39 and atmospheric passage 88. By seating the double beat valve 36 in the upper position, the application piston chamber 32 is bottled up and the application piston 31 and slide valve 33 will be maintained in their normal position by spring 35, so that the brake valve can be again moved to running position in which the brake system is recharged in the same manner as when initially charged, as hereinbefore described.

It will be noted that in releasing the brakes after an automatic train control application, that the brake valve can be moved from lap to running position at substantially the same time as the valve piston 40 is moved to its upper position. Since a certain predetermined pressure is required to shift said valve piston upwardly, and said pressure is registered on the pressure gauge 64, it is obvious that the operator can employ the gauge 64 as an indicator of the time at which he may move the brake valve to running position. This is desirable in that the timing valve portion 2 may be located remote from the operator, whereas the gauge can be located, for instance, in the operator's cab.

If the operator observes the change in track conditions, from favorable to unfavorable, he may effect an application of the brakes by operating the brake valve device 1 in the usual manner and thereby prevent a train control application of the brakes from being effected as hereinbefore described.

If the operator desires to prevent a train control application of the brakes, then at the time the signal indication changes to unfavorable, he turns the brake valve rotary valves 11 and 12 to service position, by means of the handle 13. In service position, passage 95 leading from the brake pipe 20 by way of cut-off valve chamber 25, and passage 98 leading to the equalizing piston chamber 16 and reservoir 17, are disconnected from passage 93 from the feed valve device 5, so that further flow of fluid under pressure to said brake pipe, chamber and reservoir respectively, is prevented and passage 98 is connected through a cavity 136 in the rotary valve 12 to an atmospheric passage 137. As a result, fluid under pressure is permitted to flow to the atmosphere from the equalizing piston chamber 16 and reservoir 17. The brake pipe pressure in equalizing piston chamber 19 then causes the equalizing piston 14 to operate the discharge valve 15 and effect a reduction in brake pipe pressure, corresponding in degree to the reduction in pressure in chamber 16, and thereby cause the brakes to be applied in the usual manner.

In service position of the brake valve device, passage 108 from the suppression valve diaphragm chamber 74 is connected to passage 93 from the feed valve device 5 by way of cavity 138 in the brake valve rotary valve, so that fluid at the pressure supplied by the feed valve device 5 flows to said chamber and acting on diaphragm 73 deflects said diaphragm inwardly against the pressure of spring 76, thus seating the double beat valve 77 against its outer seat.

With the suppression double beat valve 77 seated in its outer position, communication between chamber 80 and the stop reservoir 117 is cut off, so that when the timing valve piston 40 operates to permit the double beat valve 36 to seat in its lower position and thereby connect passage 91 from the application piston chamber 32 to passage 121, fluid under pressure is not vented from said piston chamber to the stop reservoir.

Furthermore, with the brake valve in service position, passage 124, which connects to passage 121 by way of check valve 123, is lapped. Thus, the application piston chamber 32 is bottled up and spring 35 maintains the piston 31 and slide valve 32 in their normal position, as shown in the drawings.

When the operator applies the brakes, instead of permitting a train control application to be effected, it is necessary that a full service application be made in order to obtain permanent suppression. Failure to effect a full service application results in the operation of the train control apparatus to continue the reduction, in the following manner.

As hereinbefore described, when the brakes are released, diaphragm chamber 67 of the insuring valve device 3 and the suppression reservoir 102 are charged with fluid under pressure from the feed valve device 5. Then when the brake valve is moved to service position, passage 101 from said reservoir is lapped, thereby bottling up the pressure in said chamber and reservoir. Brake pipe pressure being effective in diaphragm chamber 66 on the opposite side of the diaphragm 65, the spring 68 deflects said diaphragm outwardly permitting spring 71 to maintain double beat valve 69 seated in its inner position.

Fluid under pressure vented from the brake pipe past the discharge valve 15 flows to the atmosphere through choke plug 131 and also flows through pipe 130, past a ball check valve 139 and from thence through pipe and passage 105 to valve chamber 70 in the reduction insuring valve device 3, then past the double beat valve 69 to chamber 72, and to the atmosphere through passage 107, and at the same time from pipe 105 through a choked opening 140 and pipe 103 to a timing reservoir 150 which is charged at a restricted rate.

If the operator effects a full service reduction, then the reduced brake pipe pressure, effective in diaphragm chamber 66 of the insuring valve device 3 is insufficient to permit spring 68 to maintain the diaphragm 65 deflected to the right against the pressure bottled up in chamber 67, so that the pressure in chamber 67 deflects the diaphragm 65 inwardly and seats the double beat valve 69 in its outer position, in which position fluid under pressure is permitted to flow from the brake pipe 20, through pipe and passage 21, chamber 66, past double beat valve 69 in the insuring valve device 3 to chamber 70 and from thence through passage and pipe 105, a choked connection 141 and pipe and passage 108 to the suppression diaphragm chamber 74 and act therein on diaphragm 73 to maintain the double beat valve 77 seated in its outer position and thereby permanently suppress the operation of the application piston 31.

In case the operator does not effect a full service reduction in brake pipe pressure and thereby cause the reduction ensuring valve to operate as above described, and then moves his brake valve device to lap position, in which position passage 108, through which fluid under pressure is supplied to diaphragm chamber 74 in the suppression valve device, is lapped, then after the brake pipe discharge valve 15 closes, the fluid under pressure is vented from the suppression diaphragm chamber 74 through passage and pipe 108, choked opening 141, pipe and passage 105 to valve chamber 70 in the reduction ensuring valve device and from thence past the unseated double beat valve 69 to chamber 72 and through passage 107 to the atmosphere. Spring 76 then deflects the diaphragm 73 to the right, permitting spring 79 to seat double beat valve 77 in its inner position, in which a train control application of the brakes is effected in the same manner as hereinbefore described.

When the operator suppresses an automatic application of the brakes and applies the brakes by operating the brake valve device, he may desire to effect the brake pipe reduction in two stages, the first stage comprising a small reduction in brake pipe pressure for lightly setting the brakes to gather the slack in a train, and the second stage of reduction being adapted to stop or retard the speed of the train. In effecting such a two stage reduction, the brake valve is first moved to service position and then to lap position and then after a certain lapse of time, the brake valve is again moved to service position to complete the brake pipe reduction. In order to prevent the train control apparatus from continuing the brake pipe reduction, when the brake valve is moved to lap position after being in service position for the initial stage of reduction, fluid under pressure supplied to the timing reservoir 150, during the initial stage of reduction, in the manner hereinbefore described, flows back past ball check valve 104 to pipe 105 and thence slowly vents to the atmosphere through chamber 70, past double beat valve 69 to chamber 72 and from thence through the atmospheric passage 107. A certain pressure is therefore maintained in pipe 105 for a predetermined period of time. Since the suppression diaphragm chamber 74 is connected to pipe 105 through pipe 108 and choked opening 141, and passage 108 is lapped in the brake valve in lap position, a pressure will also be maintained in the suppression diaphragm chamber 74 equal to the pressure in pipe 105, and sufficient to maintain the suppression valve device operative to suppress a train control application for a predetermined period of time sufficient for the gathering of the train slack. If the operator then initiates the second stage of reduction within said predetermined time limit, permanent suppression of a train control application is obtained by operation of the insuring valve device, but if the second reduction is not effected within said predetermined time limit, then the pressure in the suppresssion diaphragm chamber 74 becomes reduced to such a degree that spring 76 will deflect diaphragm 73 outwardly, thereby permitting spring 79 to seat double beat valve 77 in its inner position, in which position a train control application of the brakes will be effected in the manner hereinbefore described.

In obtaining temporary suppression of a train control application of the brakes between the first and second stage of brake pipe reduction, a choke plug 106 in passage 105 in the insuring valve device 3 is adapted to govern the rate of reduction in pressure in the timing reservoir 150 and the ball check valve 139 is adapted to prevent back flow from passage 105 to pipe 130 and from thence to the atmosphere through the usual brake pipe exhaust port 131 in the brake valve device.

It will be noted that when the application piston 31 shifts the slide valve downwardly to application position and cavity 115 in said slide valve connects passage 163 to passage 114, that fluid under pressure supplied from the brake pipe passage 21 to passage 163 flows to passage 114 and from thence past the check valve 113 and through pipe and passage 111 to diaphragm chamber 75 of the suppression valve device. As a result, if the operator desires to suppress a train control application of the brakes, he must initiate the manual application before the application piston 31 moves to application position, in order to operate the suppression valve device 4.

While one illustrative embodiment of the invention has been described in detail, it is not my intention to limit its scope to that embodiment or otherwise than by the terms of the appended claims.

Having now described our invention, what we claim as new and desire to secure by Letters Patent, is:

1. In a train control equipment, the combination with valve means operative upon a change in signal indication to automatically effect an application of the brakes, a feed valve device, a brake pipe, valve means operative to control the operation of the first mentioned valve means and comprising an abutment, subject on one side to the pressure of fluid supplied by said feed valve device, and subject on the opposite side at one time to atmospheric pressure and at another time to the pressure of fluid in said brake pipe.

2. In a train control equipment, the combination with apparatus operative upon a change in signal indication to automatically effect an application of the brakes, a brake valve device operative to effect an application of the brakes, means operative to suppress the operation of said apparatus upon the operation of said brake valve device, said means comprising a movable abutment having a chamber at one side, a passage connecting said chamber to said brake valve device, said abutment having another chamber at the opposite side containing a spring, and a passage connecting the second mentioned chamber to said apparatus.

3. In a train control equipment, the combination with a brake application valve device operative in accordance with traffic condition to effect an application of the brakes, a suppression valve device operative to prevent the operation of said brake application valve device, and comprising a diaphragm, subject on one side to fluid pressure, a chamber at the opposite side of said diaphragm, a passage from said chamber to said brake application valve device through which the fluid pressure is controlled in said chamber in accordance with the operation of said brake application valve device, and means for permitting rapid build up of fluid pressure in said chamber and to retard the flow of fluid under pressure from said chamber.

4. In a train control equipment, the combination with a brake application valve device operative in accordance with traffic condition to effect an application of the brakes, a suppression valve device operative to prevent the operation of said brake application valve device, and comprising a diaphragm, subject on one side to fluid pressure, a chamber at the opposite side of said diaphragm, a passage from said chamber to said brake application valve device through which the fluid pressure is controlled in said chamber in accordance with the operation of said brake application valve device, a check valve and a restricted port around said check valve to permit rapid build up of fluid pressure in said chamber and to retard the flow of fluid from said chamber.

5. In a train control equipment, the combination with a brake pipe, of means operative upon a change in signal indication to effect a reduction in brake pipe pressure to apply the brakes, a brake valve device, a suppression valve device operative in one position of said brake valve device to prevent the operation of said means upon a change in signal indication, a reservoir directly connected to said suppression valve device and adapted, in another position of said brake valve device, to limit the degree of brake pipe reduction effected by the operation of said means upon a change in signal indication.

6. In a train control equipment, the combination with a brake pipe, of means operative upon a change in signal indication to effect a reduction in brake pipe pressure to apply the brakes, a brake valve device, a valve device operative to control the operation of said means, a reservoir connected directly to said valve device and adapted in one position of said brake valve device to limit the degree of brake pipe reduction effected by said means and a check valve device operative in said position of the brake valve device to permit flow of fluid under pressure from said means and reservoir to said brake valve device.

7. In an automatic train control equipment, the combination with apparatus for effecting an automatic train control application of the brakes, of a brake valve device for manually effecting an application of the brakes, a valve device operative by fluid pressure supplied by said brake valve device, in one position, to suppress the operation of said apparatus, a reservoir supplied with fluid under pressure in said position of the brake valve device for temporarily suppressing the operation of said apparatus, when said brake valve device is in another position, and a device for retarding the flow of fluid under pressure into said reservoir and for permitting an unretarded flow of fluid under pressure from said reservoir.

8. In an automatic train control apparatus, the combination with a brake pipe, of manually controlled means for venting fluid under pressure from said brake pipe to effect an application of the brakes, automatic means for venting fluid under pressure from said brake pipe, a valve mechanism subject to the pressure of fluid vented from the brake pipe by the operation of said manually controlled means for temporarily suppressing the operation of said automatic means, and a valve device operative upon a predetermined reduction in brake pipe pressure for causing said valve mechanism to permanently suppress the operation of said automatic means, said valve mechanism and valve device being directly connected together through a passage.

9. In an automatic train control apparatus, the combination with a brake pipe, of manually controlled means for venting fluid under pressure from said brake pipe to effect an application of the brakes, automatic means for venting fluid under pressure from said brake pipe, a valve device having an exhaust port through which fluid vented from the brake pipe is vented to the atmosphere, a valve for closing said exhaust port, an abutment for operating said valve, said abutment having a chamber at one side connected to said brake pipe, and a chamber at the opposite side charged with fluid at the pressure carried in said brake pipe, a feed valve device for supplying fluid at constant pressure, said manually operative means being operative in one position to supply fluid under pressure from said feed valve device to the last mentioned chamber.

In testimony whereof we have hereunto set our hands this 11th day of May, 1929.

LLOYD V. LEWIS.
EARLE S. COOK.